United States Patent
Lin et al.

(10) Patent No.: US 10,659,925 B2
(45) Date of Patent: May 19, 2020

(54) POSITIONING METHOD, TERMINAL AND SERVER

(71) Applicant: CLOUDMINDS (SHENZHEN) ROBOTICS SYSTEMS CO., LTD., Shenzhen (CN)

(72) Inventors: Yimin Lin, Chaoyang (CN); Shiguo Lian, Chaoyang (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/442,790

(22) Filed: Jun. 17, 2019

(65) Prior Publication Data

US 2019/0306666 A1   Oct. 3, 2019

Related U.S. Application Data (63) Continuation of application No. PCT/CN2016/111827, filed on Dec. 23, 2016.

(51) Int. Cl.
*H04W 24/00* (2009.01)
*H04W 4/029* (2018.01)
*G01C 21/20* (2006.01)

(52) U.S. Cl.
CPC ........... *H04W 4/029* (2018.02); *G01C 21/20* (2013.01)

(58) Field of Classification Search
USPC .............. 455/456.1, 456.3, 404.2, 440, 457; 342/357.12
See application file for complete search history.

(56) References Cited

U.S. PATENT DOCUMENTS

| | | | |
|---|---|---|---|
| 2009/0167603 A1* | 7/2009 | Muraguchi | G01S 19/22 342/357.55 |
| 2014/0168367 A1* | 6/2014 | Kang | G06T 7/85 348/46 |

(Continued)

FOREIGN PATENT DOCUMENTS

| | | |
|---|---|---|
| CN | 101619984 A | 1/2010 |
| CN | 102194367 A | 9/2011 |

(Continued)

OTHER PUBLICATIONS

International Search Report dated Aug. 30, 2017 in corresponding International application No. PCT/CN2016/111827; 5 pages.

*Primary Examiner* — David Q Nguyen
(74) *Attorney, Agent, or Firm* — Maier & Maier, PLLC (57) ABSTRACT

A positioning method, a terminal and a server, and relates to the field of positioning and navigation, for performing accurate global positioning. The positioning method includes: a terminal sends a first global coordinate to a server, the server receives the first global coordinate from the terminal, the server searches for corresponding local map data and mapping parameters corresponding to the local map data according to the first global coordinate, the server sends the local map data and the mapping parameters to the terminal, and the terminal obtains a local coordinate of the current location according to the local map data and surrounding environment information of the current location, and obtains a second global coordinate of the current location according to the local coordinate of the current location and the mapping parameters. The embodiment of the present disclosure is applied to accurate positioning.

10 Claims, 8 Drawing Sheets

(56) References Cited

U.S. PATENT DOCUMENTS

2017/0077586 A1* 3/2017 Li ............................ H01Q 1/00
2018/0007365 A1* 1/2018 Lawrence ............ H04N 19/139

FOREIGN PATENT DOCUMENTS

CN          102575939 A     7/2012
CN          102928860 A     2/2013

* cited by examiner

POSITIONING METHOD, TERMINAL AND SERVER

CROSS-REFERENCE TO RELATED APPLICATION

The present application is a continuation application under 35 U.S.C. § 120 of PCT application No. PCT/CN2016/111827 filed on Dec. 23, 2016, the contents of which are incorporated herein by reference.

FIELD OF THE INVENTION

The present invention relates to the field of positioning and navigation, and in particular, to a positioning method, a terminal, and a server.

BACKGROUND

At present, the civil positioning and navigation technology generally relies on the GNSS (global navigation satellite system), the accuracy of such navigation technology for global positioning is not high, and the error is usually at a meter level. Although the SLAM (simultaneous localization and mapping) technology in the field of robotics may provide an accurate positioning function, global positioning cannot be performed since the SLAM map data are only a relative local map.

SUMMARY OF THE INVENTION

The embodiment of the present invention provides a positioning method, a terminal, and a server for accurately performing global positioning.

In order to achieve the above object, the embodiment of the present invention adopts the following technical solutions:

In a first aspect, a positioning method is provided, including:

sending a first global coordinate of a current location to a server;

receiving local map data corresponding to the first global coordinate and mapping parameters corresponding to the local map data from the server, wherein the mapping parameters are configured to indicate a mapping relationship between global coordinates and local coordinates;

obtaining a local coordinate of the current location according to the local map data and surrounding environment information of the current location; and obtaining a second global coordinate of the current location according to the local coordinate of the current location and the mapping parameters.

In a second aspect, a positioning method is provided, including:

receiving a first global coordinate of a current location from a terminal;

searching for corresponding local map data and mapping parameters corresponding to the local map data according to the first global coordinate, wherein the mapping parameters are configured to indicate a mapping relationship between global coordinates and local coordinates; and sending the local map data and the mapping parameters to the terminal.

In a third aspect, a terminal is provided, including:

a sending unit, configured to send a first global coordinate of a current location to a server;

a receiving unit, configured to receive local map data corresponding to the first global coordinate and mapping parameters corresponding to the local map data from the server, wherein the mapping parameters are configured to indicate a mapping relationship between global coordinates and local coordinates;

an obtaining unit, configured to obtain a local coordinate of the current location according to the local map data and surrounding environment information of the current location; and the obtaining unit is further configured to obtain a second global coordinate of the current location according to the local coordinate of the current location and the mapping parameters.

In a fourth aspect, a server is provided, including:

a receiving unit, configured to receive a first global coordinate of a current location from a terminal;

an obtaining unit, configured to search for corresponding local map data and mapping parameters corresponding to the local map data according to the first global coordinate, wherein the mapping parameters are configured to indicate a mapping relationship between global coordinates and local coordinates; and a sending unit, configured to send the local map data and the mapping parameters to the terminal.

In a fifth aspect, a computer storage medium is provided, for storing a computer software instruction used by a terminal, wherein the computer software instruction contains a program code designed to execute the positioning method in the first aspect.

In a sixth aspect, a computer program product is provided, which is capable of being directly loaded in an internal memory of a computer and contains a software code, and the computer program can implement the positioning method in the first aspect after being loaded and executed by the computer.

In a seventh aspect, a terminal is provided, including a memory, a communication interface and a processor, wherein the memory is configured to store a computer executable code, the processor is configured to execute the computer executable code to control the execution of the positioning method in the first aspect, and the communication interface is configured to perform data transmission between the terminal and an external device.

In an eighth aspect, a computer storage medium is provided, for storing a computer software instruction used by a server, wherein the computer software instruction contains a program code designed to execute the positioning method in the second aspect.

In a ninth aspect, a computer program product is provided, which is capable of being directly loaded in an internal memory of a computer and contains a software code, wherein the computer program can implement the positioning method in the second aspect after being loaded and executed by the computer.

In a tenth aspect, a server is provided, including a memory, a communication interface and a processor, wherein the memory is configured to store a computer executable code, the processor is configured to execute the computer executable code to control the execution of the positioning method in the second aspect, and the communication interface is configured to perform data transmission between the server and an external device.

According to the positioning method, the terminal and the server provided by the embodiment of the present invention, the server searches for matched local map data and mapping parameters and sends the same to the terminal according to the first global coordinate which has relatively low precision sent by the terminal, and then the terminal performs positioning from the local map data according to the surrounding environment information of the current location obtained in real time to obtain the local coordinate corresponding to the surrounding environment information of the current location, the precision of the local coordinate obtained at this time is relatively high, then the obtained local coordinate is converted into the second global coordinate of the current position according to the mapping parameters. Since the second global coordinate are converted from the local coordinate with higher precision, the precision of the second global coordinate is also relatively high, thereby completing accurate global positioning.

BRIEF DESCRIPTION OF THE DRAWINGS

To illustrate technical solutions in the embodiments of the present invention or the prior art more clearly, a brief introduction on the drawings which are needed in the description of the embodiments or the prior art is given below. Apparently, the drawings in the description below are merely some of the embodiments of the present invention, based on which other drawings may be obtained by those of ordinary skills in the art without any creative effort.

DETAILED DESCRIPTION OF THE EMBODIMENTS

A clear and complete description of technical solutions in the embodiments of the present invention will be given below, in combination with the drawings in the embodiments of the present invention. Apparently, the embodiments described below are merely a part, but not all, of the embodiments of the present invention. All of other embodiments, obtained by those of ordinary skills in the art based on the embodiments of the present invention without any creative effort, fall into the protection scope of the present invention.

Figure 1:
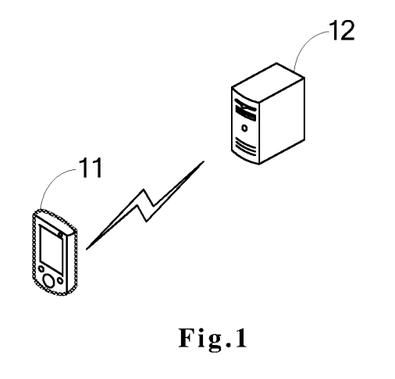
FIG. 1 is a structural schematic diagram of a positioning system provided by an embodiment of the present invention.

The embodiment of the present invention provides a positioning system, as shown in FIG. 1, including: a terminal 11 located on site and a server 12 located in the cloud, the terminal 11 obtains current global coordinate data through a global sensor and sends the current global coordinate data to the server 12 in the cloud for retrieval and matching, then the server 12 sends corresponding local map data to the terminal 11, and the terminal 11 compares the information collected by a current local sensor with the local map data to complete accurate global positioning.

Figure 2:
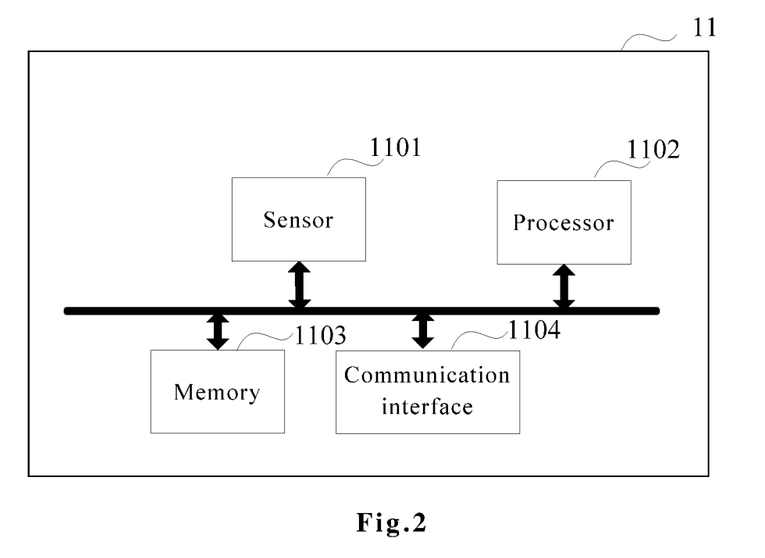
FIG. 2 is a structural schematic diagram of a terminal provided by an embodiment of the present invention.

The terminal 11 according to the embodiment of the present invention may be a smart device such as a blind guide helmet, a robot and the like, referring to FIG. 2, the terminal 11 may include a sensor 1101, a processor 1102, a memory 1103 and a communication interface 1104, which are connected with each other by a bus. The memory 1103 is configured to store codes and data and the like executed by the processor 1102, and the processor 1102 controls the sensor 1101 to collect surrounding environment information of a current location, performs preliminary processing, and then sends the surrounding environment information to the server 12 through the communication interface 1104 in a wired or wireless manner.

Figure 3:
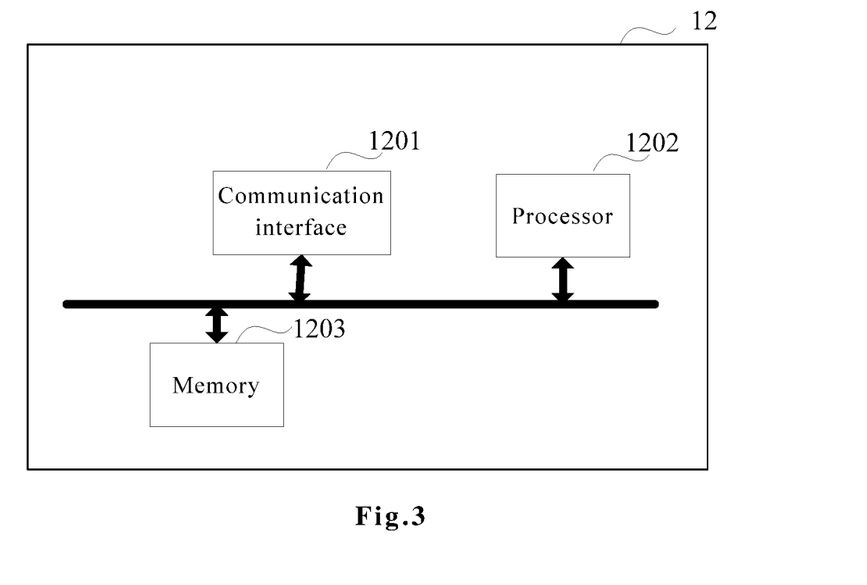
FIG. 3 is a structural schematic diagram of a server provided by an embodiment of the present invention.

Referring to FIG. 3, the server 12 according to the embodiment of the present invention may include a communication interface 1201, a processor 1202 and a memory 1203, which are connected with each other by a bus. The memory 1203 is configured to store codes and map data and the like executed by the processor 1202, and the processor 1202 controls the communication interface 1201 to receive the surrounding environment information of the current location from the terminal 11 in a wired or wireless manner, then processes the surrounding environment information and sends the processed map data to the terminal 11 via the communication interface 1201.

Figure 4:
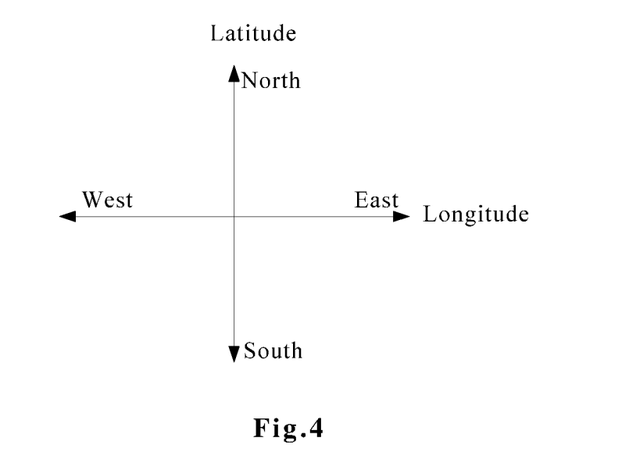
FIG. 4 is a schematic diagram of two-dimensional plane coordinate provided by an embodiment of the present invention.
Figure 5:
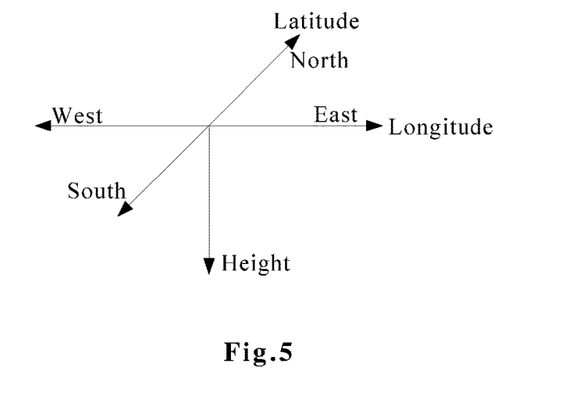
FIG. 5 is a schematic diagram of three-dimensional space coordinate provided by an embodiment of the present invention.

The local coordinate in the embodiment of the present invention includes relative coordinate within a local geographic range obtained by sensors such as visual, infrared, ultrasonic, laser radar and IMU (inertial measurement unit); and the global coordinate are absolute coordinate within global geographic range. The local coordinate and the global coordinate may be two-dimensional plane coordinate shown in FIG. 4 or three-dimensional space coordinate shown in FIG. 5. The plane coordinate obtained by means of GNSS satellite positioning (e.g., GPS (global position system), WIFI (wireless-fidelityy) positioning, base station positioning and other manners are two-dimensional plane coordinate, which may include longitude and latitude information and are generally applied to robots, self-driving cars, ships and other devices running on the land or in the ocean. On the basis of two-dimensional plane coordinate, three-dimensional space coordinate is constituted by adding height information obtained by an ultrasonic sensor or a height sensor or the like, and is generally applied to devices running in the air such as unmanned aerial vehicles, airplanes, hot air balloons and the like.

According to the positioning method, the terminal, and the server provided by the embodiment of the present invention, during the process of positioning, the server firstly performs coarse positioning according to the global data provided by the terminal to obtain corresponding local map data, then the terminal performs accurate global positioning according to the local map data and the surrounding environment information of the current location obtained in real time, so that the calculation amount of map positioning may be effectively reduced. In addition, since various processing and storage works are completed in the cloud, the resource requirements, the power consumption and the cost of the terminal side are effectively reduced.

Figure 6:
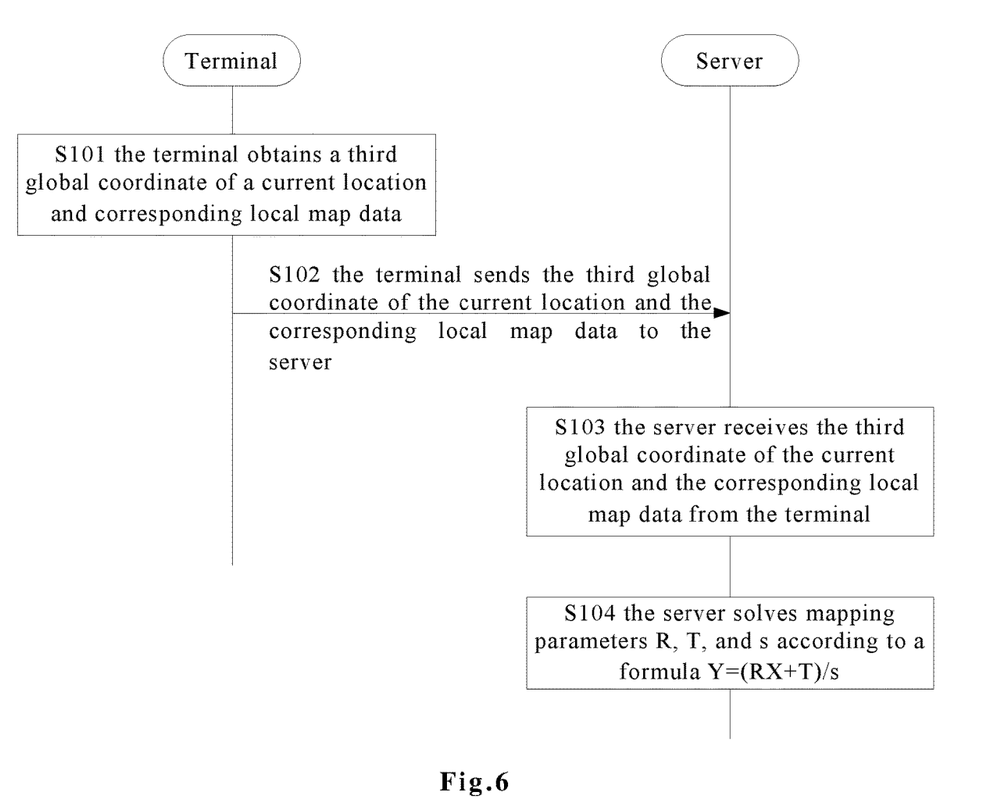
FIG. 6 is a schematic flow diagram of creating a map database on a server provided by an embodiment of the present invention.

The positioning method according to the embodiment of the present invention firstly needs to create a map database on the server, as shown in FIG. 6, specifically including:

S101. the terminal obtains a third global coordinate of a current location and corresponding local map data.

The terminal simultaneously records the global coordinates and corresponding local map data while traveling along a specific trajectory, and forms data pairs from the global coordinates and the corresponding local map data (i.e, one-to-one correspondence), and the dimension of the global coordinates is the same as the dimension of the local coordinates in the local map data.

Exemplarily, in the embodiment of the present invention, it is taken as an example for illustration that the global coordinates are GPS latitude and longitude coordinates, and the local map data are vSLAM (visual simultaneous localization and mapping) map data (i.e., including frame numbers of corresponding image frames and corresponding local coordinates).

In case that the global coordinates and the local coordinates are two-dimensional plane coordinates, exemplarily, the global coordinates (latitude and longitude) may be collected by a GPS sensor, and meanwhile, an optical center of a first frame camera is taken as the origin, an image of the environment is collected by a visual sensor, a vSLAM map creation operation is performed on the collected image, a vSLAM frame corresponding to the global coordinates and corresponding two-dimensional local coordinates are output, and the two-dimensional local coordinates at this time are horizontal and vertical axis direction coordinates of the screen.

In case that the global coordinates and the local coordinates are three-dimensional space coordinates, exemplarily, height information may also be obtained by an ultrasonic sensor or a height sensor or the like at the same time, and the two-dimensional plane coordinates and the height information are collectively used as the global coordinates; and meanwhile, the optical center of the first frame camera is taken as the origin, the image of the environment is collected by the visual sensor, the vSLAM map creation operation is performed on the collected image, frame numbers of image frames corresponding to the global coordinates and corresponding three-dimensional local coordinates are output, and the three-dimensional local coordinates at this time are horizontal and vertical axis direction coordinates and optical axis direction coordinates of the screen.

Figure 7:
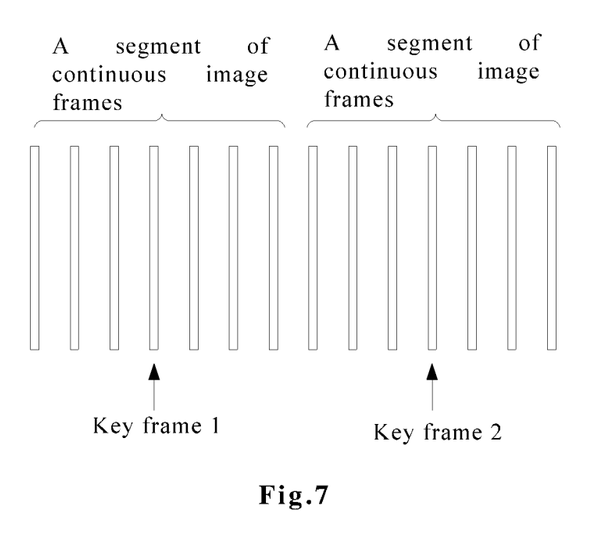
FIG. 7 is a schematic diagram of a key frame provided by an embodiment of the present invention.

In order to improve the retrieval efficiency, as shown in FIG. 7, the frame numbers of key frames and corresponding key frame local coordinates may also be output during the process of vSLAM map creation, and each key frame represents a segment of continuous image frames in the collected image.

Therefore, in case that the local map data are the vSLAM map data, the local map data includes: the frame numbers of image frames and local coordinates corresponding to the global coordinates, the frame numbers of key frames and the key frame local coordinates.

Those skilled in the art may also appreciate that the global coordinates and the local map data obtained in other ways are equally applicable to the present invention.

S102. the terminal sends the third global coordinate of the current location and corresponding local map data to the server.

S103. the server receives the third global coordinate of the current location and corresponding local map data from the terminal.

S104. the server solves mapping parameters R, T, and s according to a formula $Y=(RX+T)/s$.

Wherein, Y is an $N*1$ matrix, representing the global coordinates; X is an $N*1$ matrix, representing the local coordinates in the local map data corresponding to the global coordinates; and the mapping parameters indicate the mapping relationship between the global coordinates and the local coordinates, and specifically indicate transformation parameters used in a process of mapping the local coordinates to the global coordinates, R is an $N*N$ matrix, T is an $N*1$ matrix, R and T represent translation rotation parameters, s is a scaling factor, and N is the dimension of the global coordinates or the local coordinates. The mapping parameters R, T, and s calculated via each group of global coordinates and corresponding local map data are the same.

Specifically, the mapping parameters R, T, and s may be solved by using the least square method according to the above formula, wherein X may be all local coordinates in a group of local map data, Y represents corresponding global coordinates, and the calculated mapping parameters at this time are more accurate due to more data, but more computing resources are consumed; or, X may be the key frame local coordinates in a group of local map data, Y represents corresponding global coordinates, and the accuracy of the calculated mapping parameters at this time is reduced, but less computing resources are consumed.

In order to improve retrieval efficiency and save storage space, a map data mapping table as shown in Table 1 may be formed in case that both of the global coordinates and the local coordinates are two-dimensional plane coordinates:

TABLE 1

| Local map name | Frame number of key frame | Key frame local coordinate | Global coordinate (GPS longitude and latitude) | Mapping parameter |
|---|---|---|---|---|
| vSLAM map 1 | 1 | 0, 0 | 39.9957310255, 116.4789023070 | R1, T1, s1 |
|  | 2 | 0, 1 | 40.0016370000, 116.4854780000 |  |
|  | ... |  | ... |  |
| vSLAM map 2 | 1 | 0, 0 | 39.9142680000, 116.4049040000 | R2, T2, s2 |
|  | 2 | 0, 0.01 | 39.9140470000, 116.4057670000 |  |
|  | ... |  | ... |  |

In case that both of the global coordinates and the local coordinates are three-dimensional plane coordinates, the map data mapping table as shown in Table 2 may be formed:

TABLE 2

| Local map name | Frame number of key frame | Key frame local coordinate | Global coordinate (GPS longitude and latitude + height) | Mapping parameter |
|---|---|---|---|---|
| vSLAM map 1 | 1 | 0, 0, 0 | 39.9957310255, 116.4789023070, 2 | R1, T1, s1 |
|  | 2 | 0, 1, 2 | 40.0016370000, |  |

TABLE 2-continued

| Local map name | Frame number of key frame | Key frame local coordinate | Global coordinate (GPS longitude and latitude + height) | Mapping parameter |
|---|---|---|---|---|
| | | | 116.4854780000, 3 | |
| ... | ... | ... | ... | |
| vSLAM map 2 | 1 | 0, 0, 0 | 39.9142680000, 116.4049040000, 5 | R2, T2, s2 |
| | 2 | 0, 0.01, 5 | 39.9140470000, 116.4057670000, 10 | |
| | ... | ... | ... | |

Figure 8:
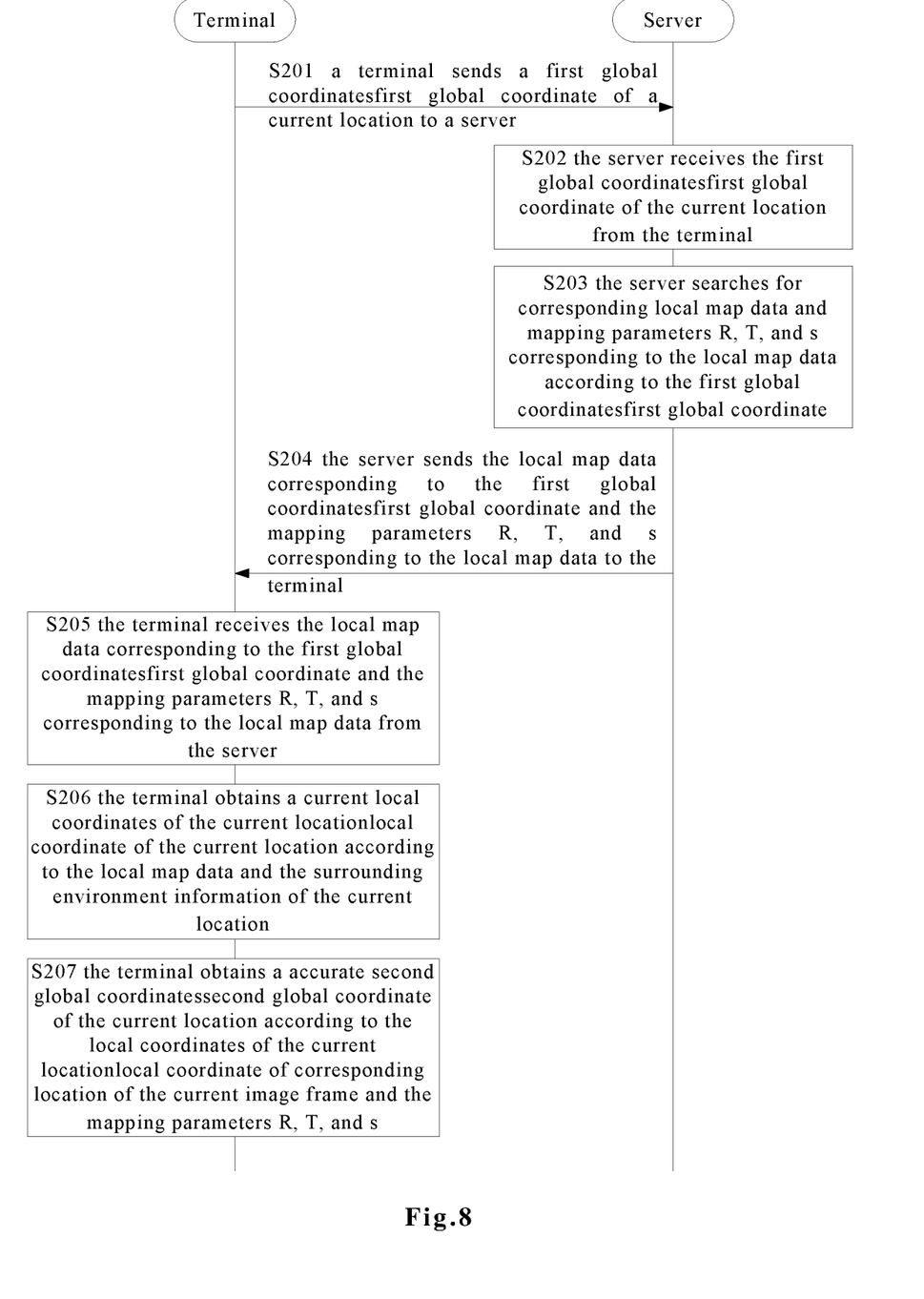
FIG. 8 is a schematic flow diagram of a positioning method provided by an embodiment of the present invention.

The positioning method provided by the embodiment of the present invention, as shown in FIG. 8, specifically includes:

S201. the terminal sends a first global coordinate of a current location to a server.

If the global coordinate of the current position obtained by the terminal through GNSS satellite positioning, WIFI positioning, base station positioning and other manners is not processed, the error thereof is at a meter level, and this global coordinate is called the first global coordinate. Furthermore, the first global coordinate may be two-dimensional plane coordinate or three-dimensional space coordinate.

S202. the server receives the first global coordinate of the current location from the terminal.

S203. the server searches for corresponding local map data and mapping parameters R, T, and s corresponding to the local map data according to the first global coordinate.

In case that the first global coordinate is two-dimensional plane coordinate, the server may query the column of the global coordinate of Table 1 to find the global coordinate with the closest Euclidean distance and to find a group of corresponding local map data and mapping parameters R, T and s simultaneously. Exemplarily, assuming that the found global coordinate with the closest Euclidean distance is 40.0016370000, 116.4854780000, then the corresponding local map data is "vSLAM map 1", and the mapping parameters are R1, T1, s1.

In case that the first global coordinate is three-dimensional plane coordinate, the server may query the column of the global coordinate of Table 2 to find the global coordinate with the closest Euclidean distance and to find a group of corresponding local map data and corresponding mapping parameters R, T and s simultaneously.

S204. the server sends the local map data corresponding to the first global coordinate and the mapping parameters R, T, and s corresponding to the local map data to the terminal.

S205. the terminal receives the local map data corresponding to the first global coordinate and the mapping parameters R, T, and s corresponding to the local map data from the server.

S206. the terminal obtains the local coordinate of the current location according to the local map data and the surrounding environment information of the current location.

Specifically, taking it as an example that the local map data is vSLAM map data and the surrounding environment information of the current location is a current image frame obtain by the visual sensor, the coordinate obtained by the terminal by performing vSLAM positioning operation according to the current image frame and the vSLAM map data is used as the local coordinate corresponding to the current image frame.

S207. the terminal obtains a second global coordinate of the current location according to the local coordinate of the current location and the mapping parameters R, T, and s.

Specifically, the terminal solves the second global coordinate of the current position according to $Y=(RX+T)/s$, wherein X is an N*1 matrix, representing the local coordinate of the current position; and Y is an N*1 matrix, representing the second global coordinate of the current location.

According to the positioning method provided by the embodiment of the present invention, the server searches for matched local map data and the mapping parameters and sends the same to the terminal according to the first global coordinate which has relatively low precision sent by the terminal, and then the terminal performs positioning from the local map data according to the surrounding environment information of the current location obtained in real time to obtain the local coordinate corresponding to the surrounding environment information of the current location, the precision of the local coordinate obtained at this time is relatively high, then the obtained local coordinate is converted into the second global coordinate of the current position according to the mapping parameters. Since the second global coordinate are converted from the local coordinate with higher precision, the precision of the second global coordinate is also relatively high, thereby completing accurate global positioning.

Those skilled in the art will readily appreciate that the present invention may be implemented by hardware or a combination of hardware and computer software in combination with the units and algorithm steps of the various examples described in the embodiments disclosed herein. Whether a certain function is implemented in the form of hardware or driving hardware depends on the specific applications and design constraint conditions of the technical solutions. Those skilled in the art may implement the described functions by using different methods for each specific application, but this implementation should not be considered beyond the scope of the present invention.

The embodiment of the present invention may divide the function modules of the terminal according to the above method example, for example, the function modules may be divided according to the functions, and two or more functions may also be integrated into one processing module. The above integrated module may be implemented in the form of hardware and may also be implemented in the form of a software function module. It should be noted that the division of the modules in the embodiment of the present invention is schematic and is only a logical function division, and other division manners may be provided during the actual implementation.

Figure 9:
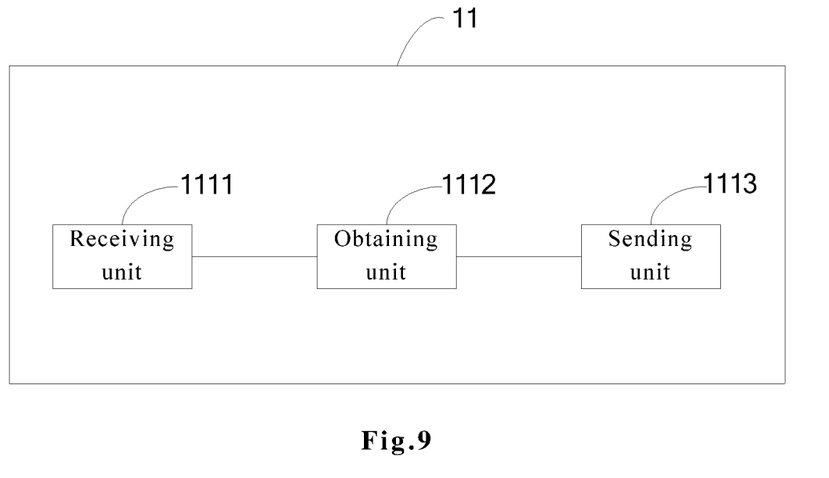
FIG. 9 is a structural schematic diagram of another terminal provided by an embodiment of the present invention.

In the case that the function modules are divided according to the functions, FIG. 9 shows a possible structural schematic diagram of the terminal involved in the above embodiments, the terminal 11 includes a receiving unit 1111, an obtaining unit 1112 and a sending unit 1113. The receiving unit 1111 is configured to support the terminal to execute the process S205 in FIG. 8; the obtaining unit 1112 is configured to support the terminal to execute the process S101 in FIG. 6 and the processes S206, S207 in FIG. 8; and the sending unit 1113 is configured to support the terminal to execute the process S102 in FIG. 6 and the process S201 in FIG. 8. All the related contents of the steps involved in the foregoing method embodiment may be quoted to the function descriptions of the corresponding function modules, and thus details are not described herein again.

Figure 10:
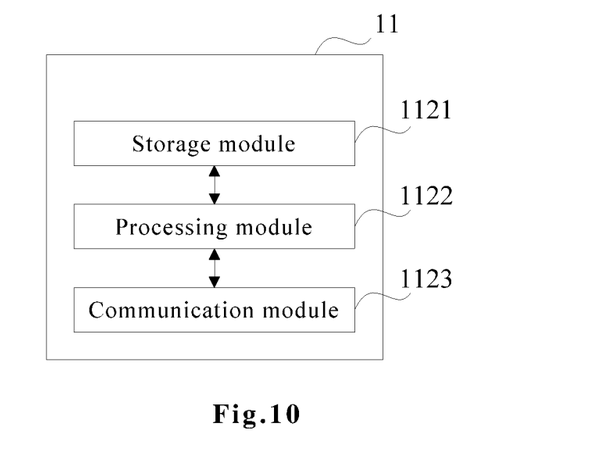
FIG. 10 is a structural schematic diagram of yet another terminal provided by an embodiment of the present invention.

In the case that the integrated unit is adopted, FIG. 10 shows a possible structural schematic diagram of the terminal involved in the above embodiments. The terminal 11 includes a processing module 1122 and a communication module 1123. The processing module 1122 is configured to perform control and management on the actions of the terminal, for example, the processing module 1122 is configured to support the terminal to execute the process S101 in FIG. 6 and the processes S206, S207 in FIG. 8. The communication module 1123 is configured to support the communication between the terminal and other entities, for example, the communication between the terminal and the function modules or network entities shown in FIG. 1. The terminal 11 may further include a storage module 1121, configured to store a program code and data of the terminal.

The processing module 1122 may be a processor or a controller, for example, may be a central processing unit (CPU), a general purpose processor, a digital signal processor (DSP), an application-specific integrated circuit (ASIC), a field programmable gate array (FPGA) or other programmable logic devices, transistor logic devices, hardware components or any combinations thereof. The processing module may implement or execute logic boxes, modules and circuits of various examples described in combination with the contents disclosed by the present invention. The processor may also be a combination for implementing a computing function, for example, a combination including one or more microprocessors, a combination of a DSP and a microprocessor, and the like. The communication module 1123 may be a transceiver, a transceiver circuit or a communication interface and the like. The storage module 1121 may be a memory.

Figure 11:
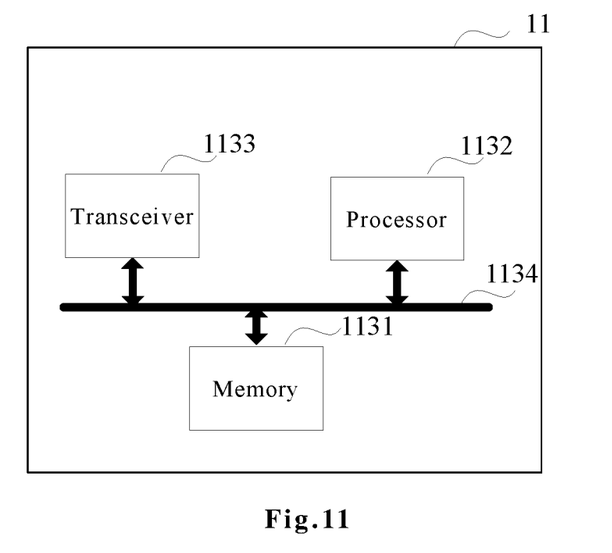
FIG. 11 is a structural schematic diagram of yet another terminal provided by an embodiment of the present invention.

In case that the processing module 1122 is a processor, the communication module 1123 is a transceiver, and the storage module 1121 is a memory, the terminal involved in the embodiment of the present invention may be the terminal as shown in FIG. 11.

Referring to FIG. 11, the terminal 11 includes a processor 1132, a transceiver 1133, a memory 1131 and a bus 1134. The transceiver 1133, the processor 1132 and the memory 1131 are connected to each other through the bus 1134; the bus 1134 may be a peripheral component interconnect (PCI) bus or an extended industry standard architecture (EISA) bus or the like. The bus may be divided into an address bus, a data bus, a control bus and the like. For the ease of representation, the bus is only expressed by a thick line in FIG. 11, but it does not mean that there is only one bus or one type of bus.

The steps of the method or algorithm described in combination with the contents disclosed by the present invention may be implemented in the form of hardware and may also be implemented by a processor executing software instructions. The embodiment of the present invention further provides a storage medium, the storage medium may include a memory 1131, configured to store a computer software instruction used by the terminal, and the computer software instruction includes a program code designed to execute the positioning method. Specifically, the software instruction may be composed of corresponding software modules, the software modules may be stored in a random access memory (RAM), a flash memory, a read only memory (ROM), an erasable programmable read-only memory (EPROM), an electrically EPROM (EEPROM), or any other form of storage medium known in the art. An exemplary storage medium is coupled to the processor, so that the processor may read information from and write information to the storage medium. Of course, the storage medium may also be a constituent part of the processor. The processor and the storage medium may be located in an ASIC. Additionally, the ASIC may be located in the terminal. Of course, the processor and the storage medium may also exist as discrete components in the terminal.

The embodiment of the present invention further provides a computer program, the computer program may be directly loaded into the memory 1131 and contains a software code, and the computer program may implement the above positioning method after being loaded and executed by a computer.

Figure 12:
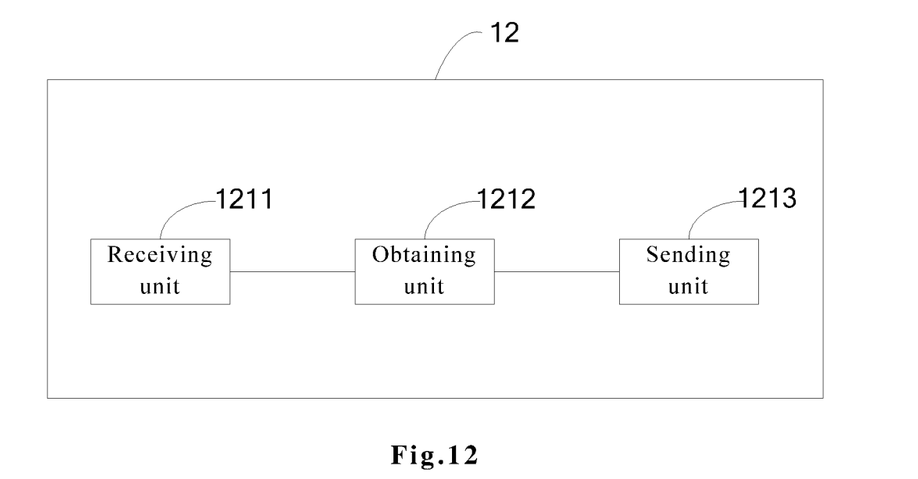
FIG. 12 is a structural schematic diagram of another server provided by an embodiment of the present invention.

In the case that the function modules are divided according to the functions, FIG. 12 shows a possible structural schematic diagram of the server involved in the above embodiments, the server 12 includes a receiving unit 1211, an obtaining unit 1212 and a sending unit 1213. The receiving unit 1211 is configured to support the server to execute the process S103 in FIG. 6 and the process S202 in FIG. 8; the obtaining unit 1212 is configured to support the server to execute the process S104 in FIG. 6 and the process S203 in FIG. 8; and the sending unit 1213 is configured to support the server to execute the process S204 in FIG. 8. All the related contents of the steps involved in the foregoing method embodiment may be quoted to the function descriptions of the corresponding function modules, and thus details are not described herein again.

Figure 13:
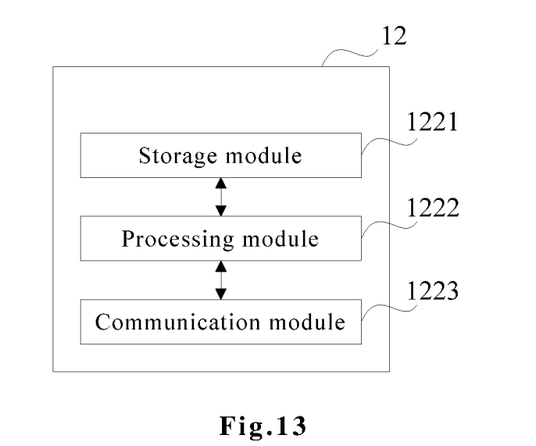
FIG. 13 is a structural schematic diagram of yet another server provided by an embodiment of the present invention.

In the case that the integrated unit is adopted, FIG. 13 shows a possible structural schematic diagram of the server involved in the above embodiments. The server 12 includes a processing module 1222 and a communication module 1223. The processing module 1222 is configured to perform control and management on the actions of the server, for example, the processing module 1222 is configured to support the server to execute the process S104 in FIG. 6 and the process S203 in FIG. 8. The communication module 1223 is configured to support the communication between the server and other entities, for example, the communication between the server and the function modules or network entities shown in FIG. 1. The server 12 may further include a storage module 1221, configured to store a program code and data of the server.

The processing module 1222 may be a processor or a controller, for example, may be a central processing unit (CPU), a general purpose processor, a digital signal processor (DSP), an application-specific integrated circuit (ASIC), a field programmable gate array (FPGA) or other programmable logic devices, transistor logic devices, hardware components or any combinations thereof. The processing module may implement or execute logic boxes, modules and circuits of various examples described in combination with the contents disclosed by the present invention. The processor may also be a combination for implementing a computing function, for example, a combination including one or more microprocessors, a combination of a DSP and a microprocessor, and the like. The communication module 1223 may be a transceiver, a transceiver circuit or a communication interface and the like. The storage module 1221 may be a memory.

Figure 14:
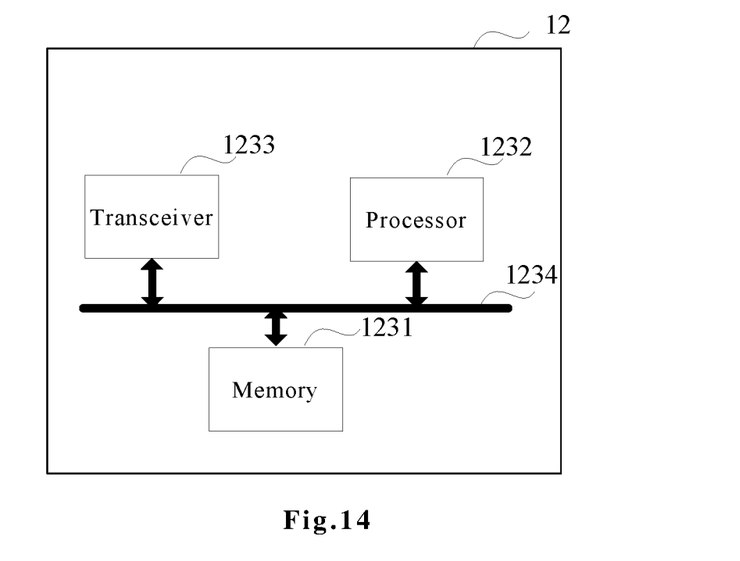
FIG. 14 is a structural schematic diagram of yet another server provided by an embodiment of the present invention.

In case that the processing module 1222 is a processor, the communication module 1223 is a transceiver, and the storage module 1221 is a memory, the server involved in the embodiments of the present invention may be the server as shown in FIG. 14.

Referring to FIG. 14, the server 12 includes a processor 1232, a transceiver 1233, a memory 1231 and a bus 1234. The transceiver 1233, the processor 1232 and the memory 1231 are connected to each other through the bus 1234; the bus 1234 may be a peripheral component interconnect (PCI) bus or an extended industry standard architecture (EISA) bus or the like. The bus may be divided into an address bus, a data bus, a control bus and the like. For the ease of representation, the bus is only expressed by a thick line in FIG. 11, but it does not mean that there is only one bus or one type of bus.

The steps of the method or algorithm described in combination with the contents disclosed by the present invention may be implemented in the form of hardware and may also be implemented by a processor executing software instructions. The embodiment of the present invention further provides a storage medium, the storage medium may include a memory 1231, configured to store a computer software instruction used by the server, and the computer software instruction includes a program code designed to execute the positioning method. Specifically, the software instruction may be composed of corresponding software modules, the software modules may be stored in a random access memory (RAM), a flash memory, a read only memory (ROM), an erasable programmable read-only memory (EPROM), an electrically EPROM (EEPROM), or any other form of storage medium known in the art. An exemplary storage medium is coupled to the processor, so that the processor may read information from and write information to the storage medium. Of course, the storage medium may also be a constituent part of the processor. The processor and the storage medium may be located in an ASIC. Additionally, the ASIC may be located in the server. Of course, the processor and the storage medium may also exist as discrete components in the server.

The embodiment of the present invention further provides a computer program, the computer program may be directly loaded into the memory 1231 and contains a software code, and the computer program may implement the above positioning method after being loaded and executed by a computer.

The foregoing descriptions are merely specific embodiments of the present invention, but the protection scope of the present invention is not limited thereto. Any skilled one who is familiar with this art could readily think of variations or substitutions within the disclosed technical scope of the present invention, and these variations or substitutions shall fall within the protection scope of the present invention. Accordingly, the protection scope of the present invention should be subject to the protection scope of the claims.

The invention claimed is:

1. A positioning method, comprising:
sending a first global coordinate of a current location to a server;
receiving local map data corresponding to the first global coordinate and mapping parameters corresponding to the local map data from the server, wherein the mapping parameters are configured to indicate a mapping relationship between global coordinates and local coordinates;
obtaining a local coordinate of the current location according to the local map data and surrounding environment information of the current location; and
obtaining a second global coordinate of the current location according to the local coordinate of the current location and the mapping parameters;
wherein the mapping parameters comprise R, T and s, R is a N*N matrix, T is a N*1 matrix, s is a scaling factor, N is a dimension value of the global coordinate or the local coordinate, and the dimension value of the global coordinate is the same as the dimension value of the local coordinate; and
said obtaining a second global coordinate of the current location according to the local coordinate of the current location and the mapping parameters comprises:
obtaining the second global coordinate according to a formula Y=(RX+T)/s, wherein X is an N*1 matrix, representing the local coordinates of the current position; and Y is an N*1 matrix, representing the second global coordinate of the current location.

2. The method according to claim 1, wherein before said sending a first global coordinate of a current location to a server, the method further comprises:
sending a third global coordinate of the current location and corresponding local map data to the server.

3. The method according to claim 1, wherein, the local map data is visual simultaneous localization and mapping (vSLAM) map data, and the surrounding environment information of the current location is a current image frame, and
said obtaining a local coordinate of the current location according to the local map data and surrounding environment information of the current location comprises:
using coordinate obtained by performing a vSLAM positioning operation according to the current image frame and the vSLAM map data as the local coordinate of the current location.

4. A positioning method, comprising:
receiving a first global coordinate of a current location from a terminal;
searching for corresponding local map data and mapping parameters corresponding to the local map data according to the first global coordinate, wherein the mapping parameters are configured to indicate a mapping relationship between global coordinates and local coordinates; and
sending the local map data and the mapping parameters to the terminal;
wherein before said receiving a first global coordinate of a current location from a terminal, the method further comprises:
receiving a global coordinate Y and corresponding local map data from the terminal, wherein the local map data comprises a local coordinate X, wherein X is a N*1 matrix, Y is a N*1 matrix, N is a dimension value of the global coordinate and the local coordinate, and the dimension value of the global coordinate is the same as the dimension value of the local coordinate; and
solving mapping parameters R, T and s according to a formula Y=(RX+T)/s, wherein R is a N*N matrix, T is a N*1 matrix, and s is a scaling factor.

5. The method according to claim 4, wherein said searching for corresponding local map data and mapping parameters corresponding to the local map data according to the first global coordinate comprises:
searching for a global coordinate with the nearest Euclidean distance according to the first global coordinate, and finding corresponding local map data and corresponding mapping parameters according to the global coordinate with the nearest Euclidean distance.

6. The method according to claim 4, wherein, the local map data is visual simultaneous localization and mapping (vSLAM) map data.

7. A computer storage medium comprising a computer-readable memory and configured to store a computer software instruction used by a terminal, wherein the computer software instruction comprises a program code designed for executing the following steps:

sending a first global coordinate of a current location to a server;

receiving local map data corresponding to the first global coordinate and mapping parameters corresponding to the local map data from the server, wherein the mapping parameters are configured to indicate a mapping relationship between global coordinates and local coordinates;

obtaining a local coordinate of the current location according to the local map data and surrounding environment information of the current location; and obtaining a second global coordinate of the current location according to the local coordinate of the current location and the mapping parameters;

wherein the mapping parameters comprise R, T and s, R is a N*N matrix, T is a N*1 matrix, s is a scaling factor, N is a dimension value of the global coordinate or the local coordinate, and the dimension value of the global coordinate is the same as the dimension value of the local coordinate; and said obtaining a second global coordinate of the current location according to the local coordinate of the current location and the mapping parameters comprises:

obtaining the second global coordinate according to a formula Y=(RX+T)/s, wherein X is an N*1 matrix, representing the local coordinates of the current position; and Y is an N*1 matrix, representing the second global coordinate of the current location.

8. A terminal, comprising:

a memory, a communication interface and a processor, wherein the memory is configured to store a computer executable code, and the processor is configured to execute the computer executable code to control the execution of the positioning method according to claim 1, and the communication interface is configured to perform data transmission between the terminal and an external device.

9. A computer storage medium comprising a computer-readable memory and configured to store a computer software instruction used by a server, wherein the computer software instruction comprises a program code designed for executing the following steps:

receiving a first global coordinate of a current location from a terminal;

searching for corresponding local map data and mapping parameters corresponding to the local map data according to the first global coordinate, wherein the mapping parameters are configured to indicate a mapping relationship between global coordinates and local coordinates; and sending the local map data and the mapping parameters to the terminal;

wherein before said receiving a first global coordinate of a current location from a terminal, the method further comprises:

receiving a global coordinate Y and corresponding local map data from the terminal, wherein the local map data comprises a local coordinate X, wherein X is a N*1 matrix, Y is a N*1 matrix, N is a dimension value of the global coordinate and the local coordinate, and the dimension value of the global coordinate is the same as the dimension value of the local coordinate; and solving mapping parameters R, T and s according to a formula Y=(RX+T)/s, wherein R is a N*N matrix, T is a N*1 matrix, and s is a scaling factor.

10. A server, comprising a memory, a communication interface and a processor, wherein the memory is configured to store a computer executable code, the processor is configured to execute the computer executable code to control the execution of the positioning method according to claim 4, and the communication interface is configured to perform data transmission between the server and an external device.

* * * * *